Nov. 30, 1965     W. L. CUTHBERT, JR., ETAL     3,220,302
PRINTER PROCESSOR ACCESSORY FOR A PROJECTION FILM READER
Filed Dec. 18, 1961                               8 Sheets-Sheet 1

WILLIAM L. CUTHBERT, JR.
WILLIAM A. MacDONALD, JR.
NORMAN J. ROSENBURGH
CHARLES E. SWING
INVENTORS

BY *R. Frank Smith*
*Paul R. Holmes*
ATTORNEYS

Nov. 30, 1965    W. L. CUTHBERT, JR., ETAL    3,220,302
PRINTER PROCESSOR ACCESSORY FOR A PROJECTION FILM READER
Filed Dec. 18, 1961    8 Sheets-Sheet 2

WILLIAM L. CUTHBERT, JR.
WILLIAM A. MacDONALD, JR.
NORMAN J. ROSENBURGH
CHARLES E. SWING
INVENTORS

BY
ATTORNEYS

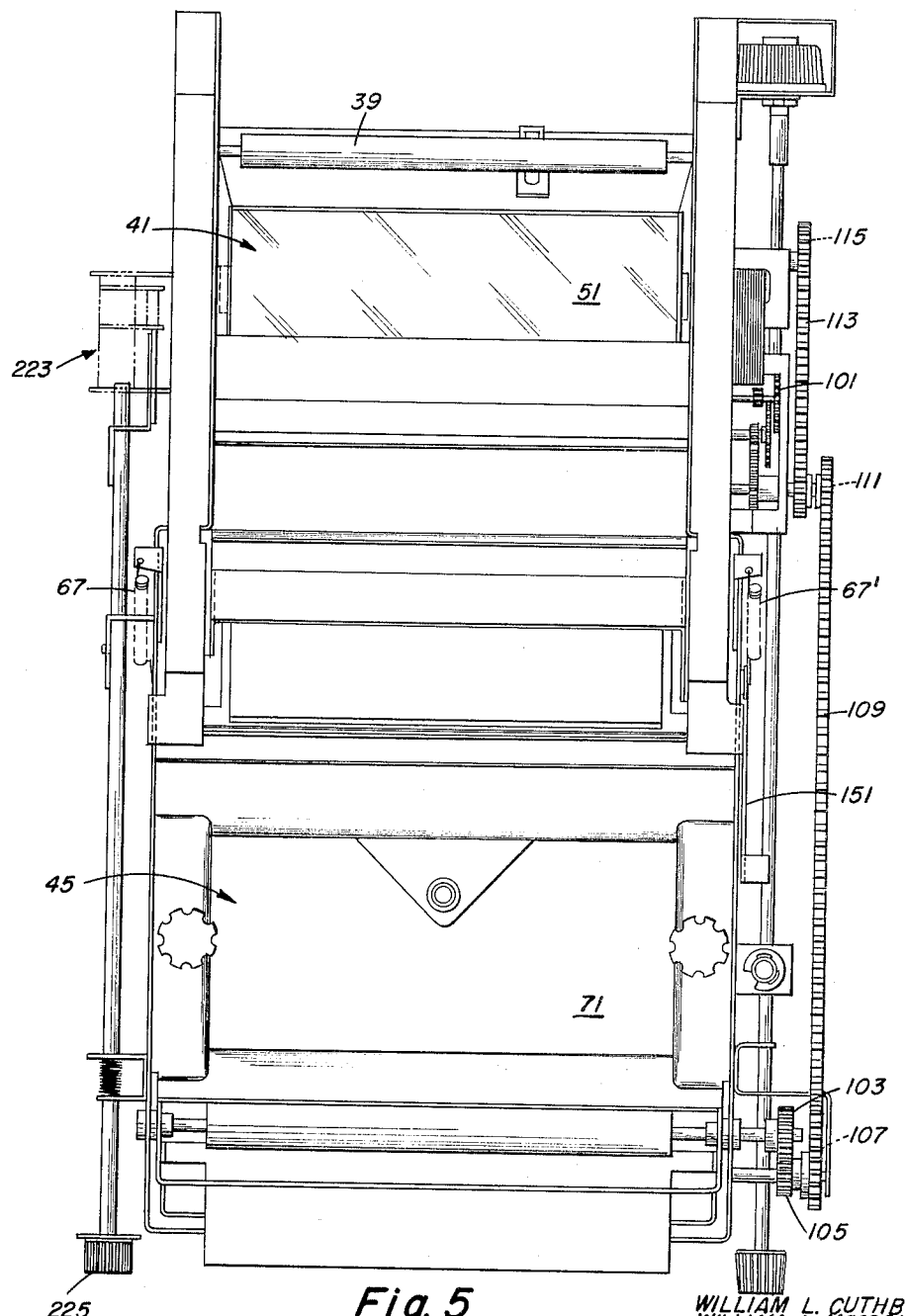

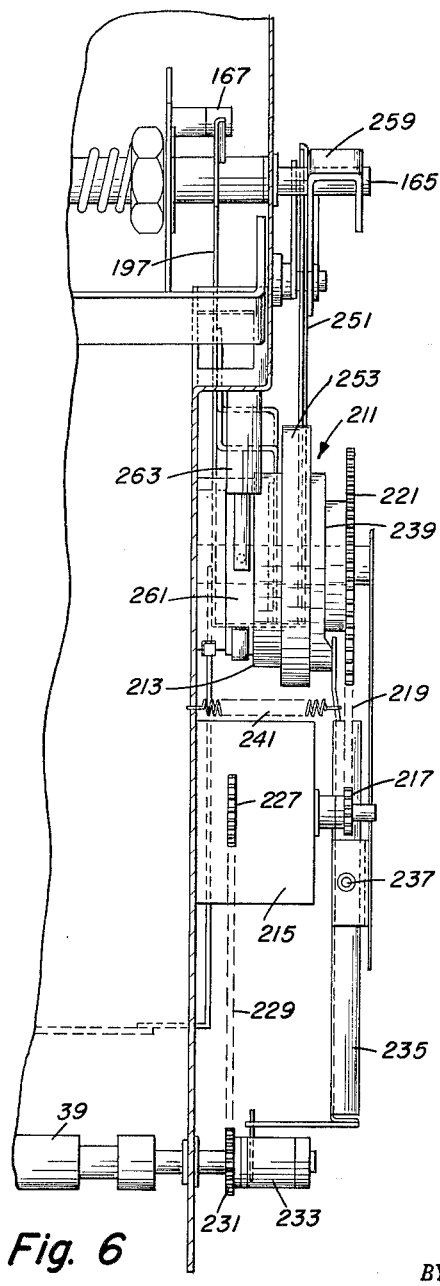

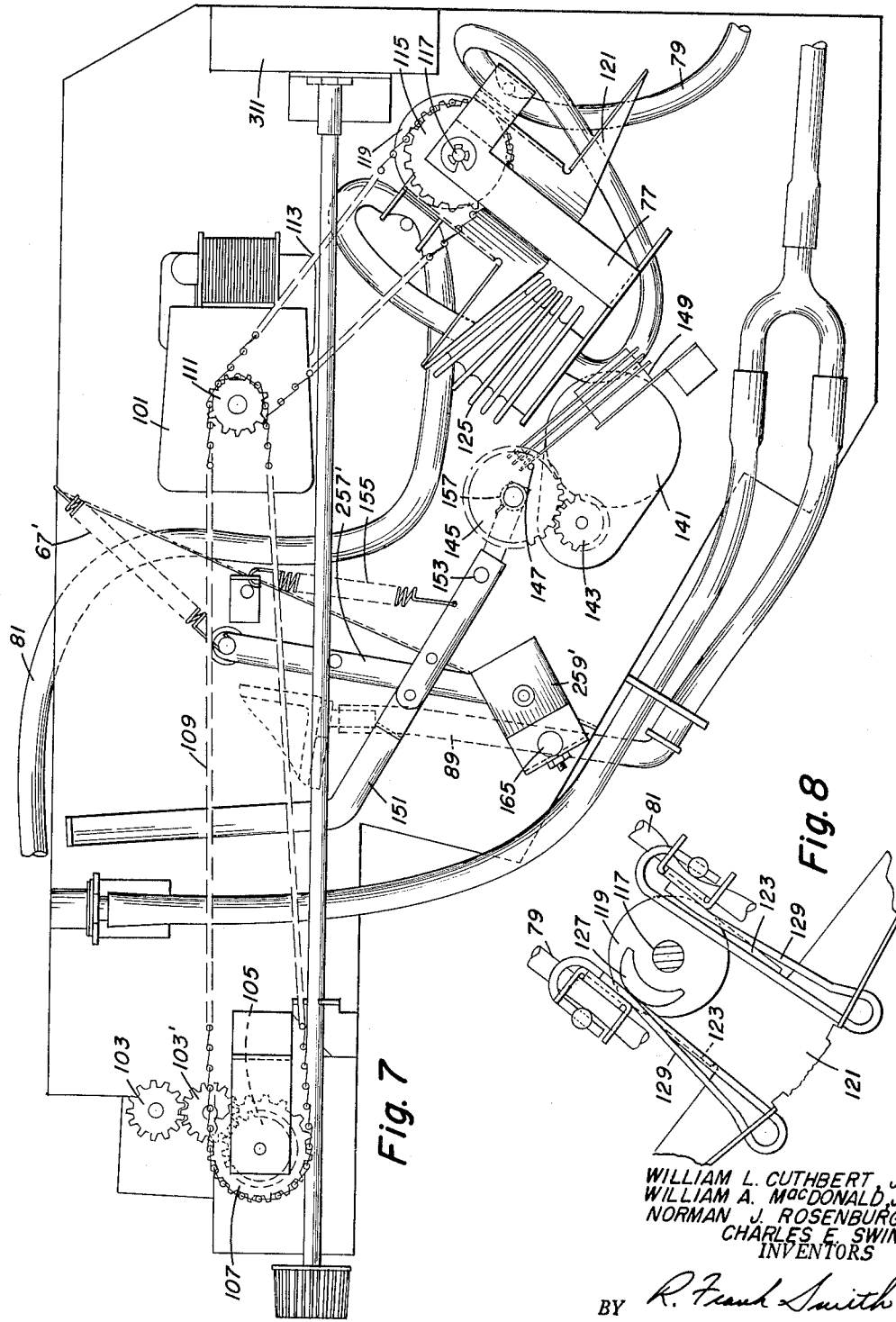

3,220,302
PRINTER PROCESSOR ACCESSORY FOR A PROJECTION FILM READER
William L. Cuthbert, Jr., William A. MacDonald, Jr., Norman J. Rosenburgh, and Charles E. Swing, all of Rochester, N.Y., assignors to Eastman Kodak Company, Rochester, N.Y., a corporation of New Jersey
Filed Dec. 18, 1961, Ser. No. 160,140
6 Claims. (Cl. 88—24)

This invention relates to a printer-processor accessory which is designed for attachment to a projection film reader.

The use of projection film readers for information look-up has become more prevalent in industry. As a result many refinements in such readers have been made in the past few years. One of the more recent innovations has been the provision of means for making copies of prints of selected information viewed in the readers. This enables one to study the information at leisure without tieing up the reader for extensive periods of time and to provide copies of the information to others if desired. The design of a satisfactory projection film reader having the facility of printout, that is, the ability to make prints of any selected image, is a costly project. In order to avoid the complication of designing a new projection reader, the printer-processor accessory of the present invention was designed primarily for attachment and use on an existing projection film reader. Of course, the novel concepts of the printer-processor accessory of the present invention could be utilized with other types of film readers with little or no modification to the novel design, but in order to facilitate the understanding of the invention, it will be described with reference to the existing and commercially avilable projection film reader with which the accessory was originally devised for use. Broadly, the printer-processor accessory of the present invention comprises a novel arrangement of mechanism within a housing which is adapted to be carried in a piggyback relation on an existing projection film reader. Such mechanism includes a chamber for storing a supply of photosensitive print material, a chamber for receiving and storing a supply of processing solution and an exposure station, a cutoff station and a processing station.

The primary object of the present invention is, therefore, to provide a printer-processor accessory which is designed for attachment to and use with an existing projection film reader.

Another object of the present invention is to provide a printer-processor accessory which is designed to be mounted in piggyback relation on an existing projection film reader.

Yet another object of the present invention is to provide a printer-processor accessory for use on an existing projection film reader in which print exposure cutoff and processing of the exposed print is automatically sequenced and controlled.

Another object of the present invention is to provide a printer-processor accessory for attachment to an existing projection film reader in which the desired print is delivered to the front of the apparatus at a convenient location to be received by the operator.

Still other objects and advantages of the present invention will become readily apparent to those skilled in the art from the following description with reference to the drawings in which like characters denote like parts and wherein.

Figure 4A:
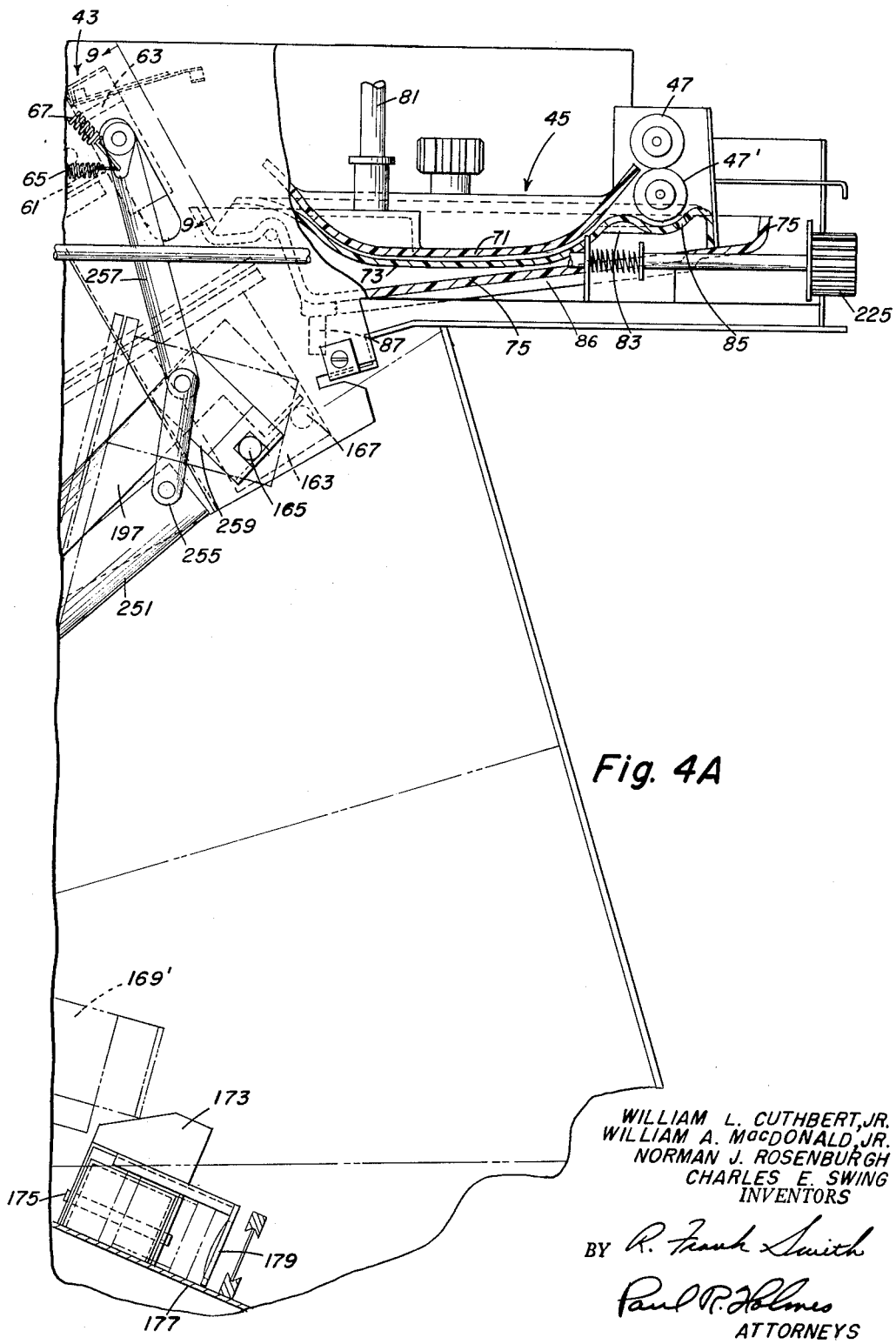
Figure 4B:
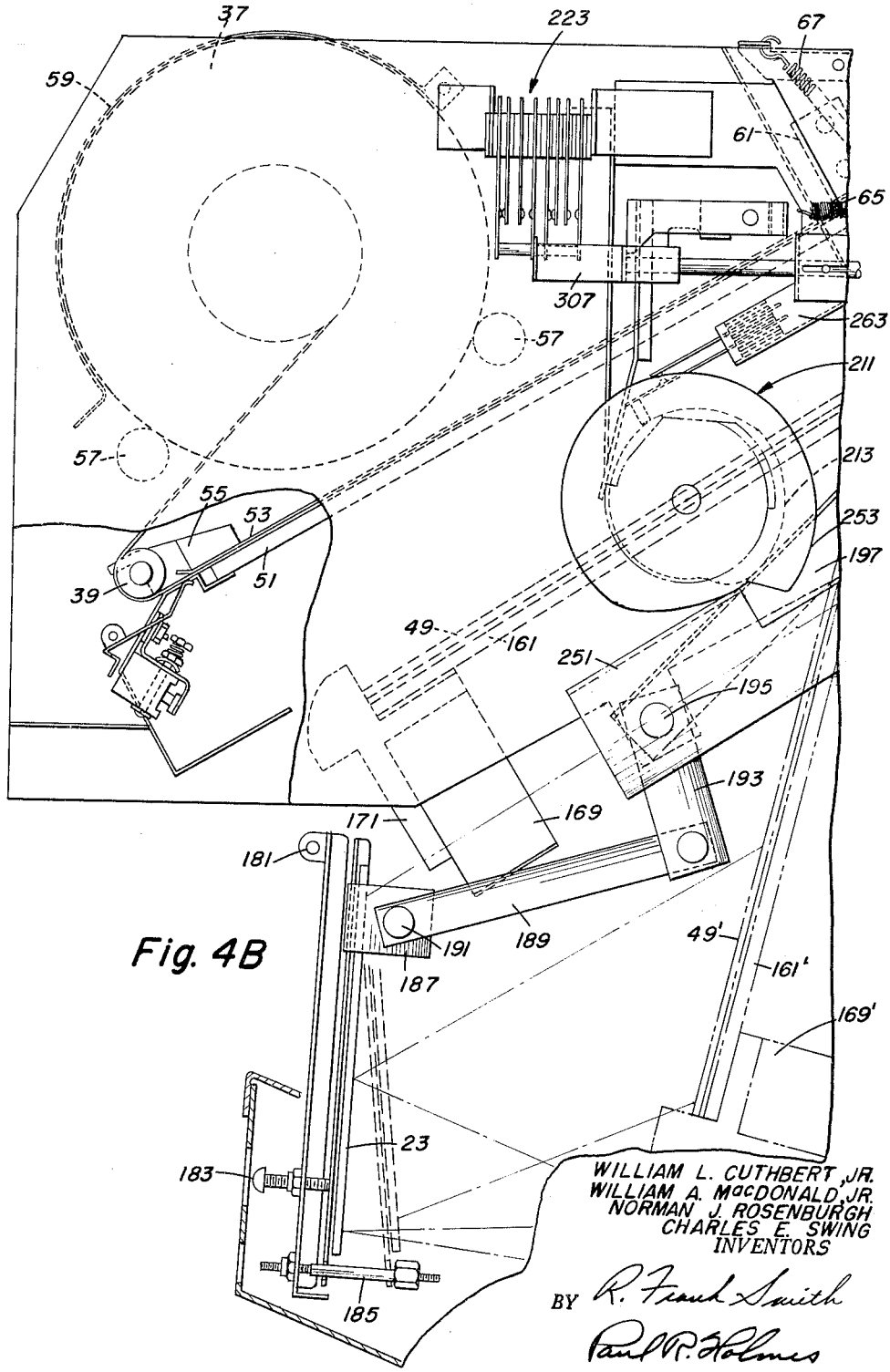
Figure 9:
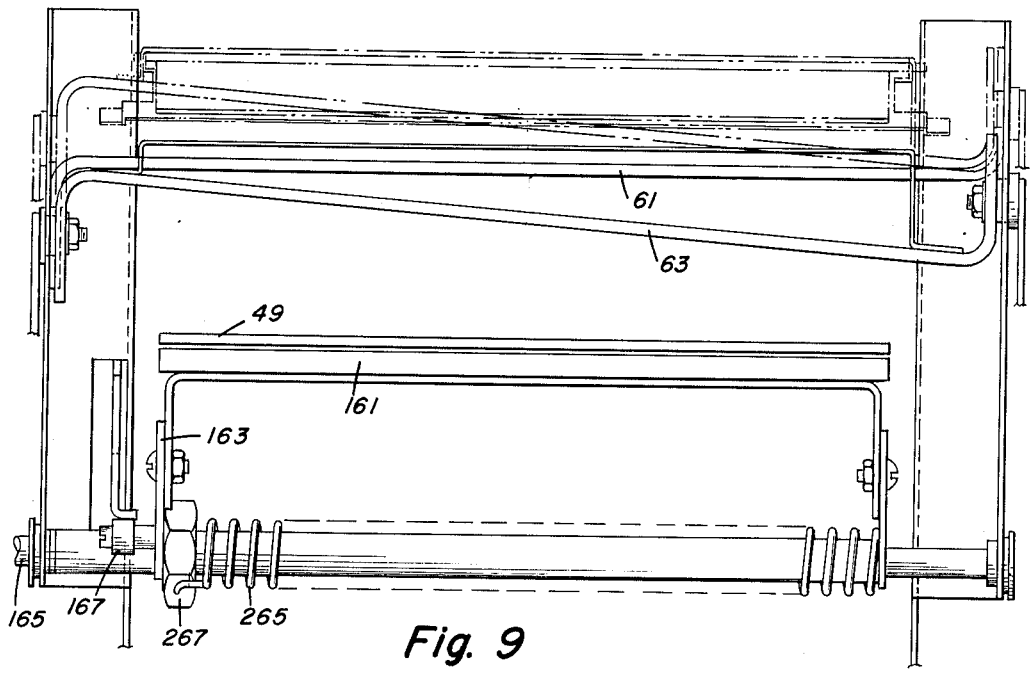

FIG. 4A and B are side elevation views showing the operating mechanism of the accessory;

FIGS. 5 and 6 are top views further showing the mechanism of the accessory;

FIG. 7 is an elevation view showing the mechanism on the side opposite that shown in FIG. 4;

FIG. 8 is a detail view of the processor pump in the apparatus;

FIG. 9 is a detail view taken along lines 9—9 of FIG. 4A; and

Figure 10:
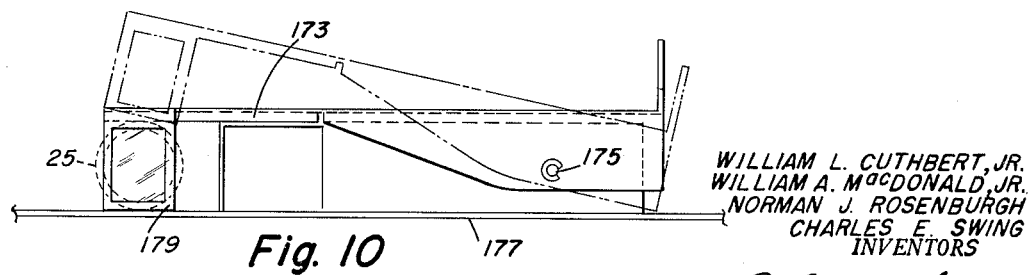

FIG. 10 is a front view of the movable lens element shown in FIG. 4.

Figure 1:
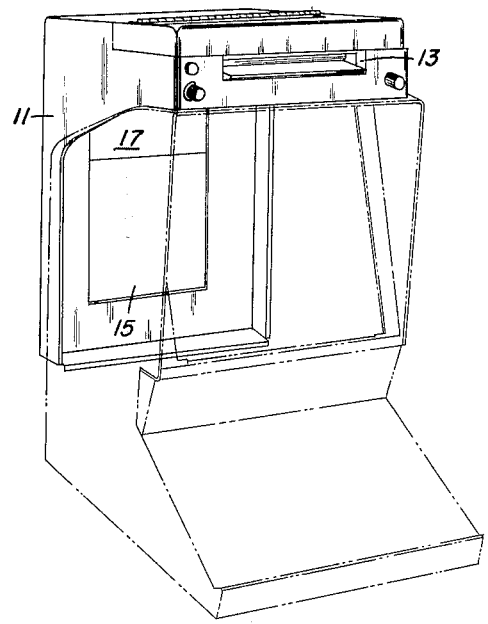
FIGS. 1 and 2 are picture views of the housing for printer-processor accessory of the present invention.
Figure 2:
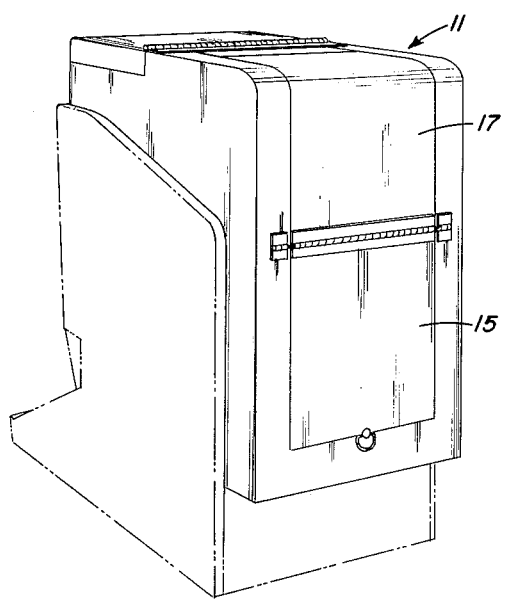

The printer-processor accessory of the present invention comprises housing 11 having a substantially inverted L-shape which is adapted to be mounted in piggyback relation on the top and rear of a projection film reader housing as best shown in FIGS. 1 and 2, wherein the projection film reader is in phantom so as to better show the printer housing. Printer housing 11 has an upper forwardly extending portion provided with a print discharge opening 13 conveniently arranged above the screen of the projection reader. The housing 11 also has a rear downwardly extending portion having access openings which are provided with lighttight doors 15 and 17. The purpose served by the access openings and doors will be hereinafter explained.

Figure 3:
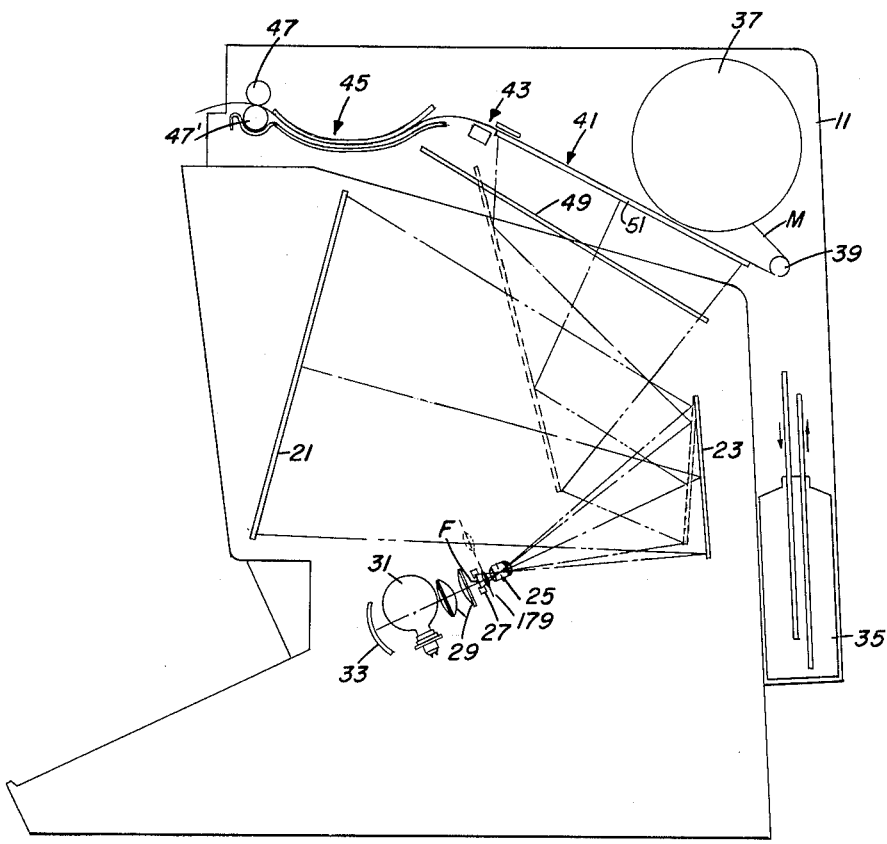
FIG. 3 is a schematic view showing the accessory of the present invention as it is adapted for use with a projection film reader.

Referring now to FIG. 3, the projection reader comprises a viewing screen 21, a rear projection mirror 23, a projection lens 25, a film gate 27 adapted to receive a strip of film F, condensing optics 29, a projection lamp 31 and a reflector 33. To operate the reader a strip of film F bearing images, microfilm, for example, is selectively moved through the film gate 27 by conventional drive means, not shown, and the images on the film F are projected by the optics of the reader to mirror 23 and onto the viewing screen 21. The film reader and its operating mechanism are well known in the art and will not be described in detail herein.

The projection printer accessory comprises a bottle 35 which contains a supply of monobath processing solution and is carried in the lower rear portion of housing 11, a roll 37 of unexposed photosensitive print material M, a driven roller 39 for moving print material M from the roll 37 to the printing station 41 and after exposure through the cutoff station 43 and processing unit 45. The processing unit 45 includes squeegee and drive rollers 47 and 47' for discharging the processed print material from the processing unit 45 to the front of the projection printer through opening 13. The projection printer also incorporates means for pivoting rear mirror 23 about its upper edge forward slightly and means for moving an upper mirror 49 downwardly into the path of a projected image so as to intercept the image from mirror 23 and to direct the same into station 41 for exposure on the print material M therein. The projection printer accessory also includes means for modifying the optical system of the projection reader so that the image which is projected into the printing station 41 is in focus on the print material M and is sufficiently reduced in size to fit the reduced size of the printing station, the size of the printing station being smaller than the size of projected images on the viewing screen 21. It will now be apparent that the door 15 permits one to exchange the container 35 of processing solution for a fresh supply when necessary and that the door 17 permits one to install a new roll 37 of print material when the existing roll has been used up. As best shown in FIG. 2 both doors are hinged together to the rear of the housing 11.

Photosensitive print material M is drawn from roll 37 by means of driven roller 39 and pushed into the printing station 41 above glass platen 51. The print material M is maintained in close contact with platen 51 by the weight of a pressure plate 53 which is held by bracket 55 which is latched around the shaft for the drive roller 39. Roll 37 is rotatably supported within the accessory by means of small rollers 57 which engage the end flanges of that support on the roll of print material. The cover 59 protects the photosensitive print material in roll 37 from exposure by stray light. Cutoff station 43 is located at the other end of printing station 41 and comprises a fixed knife 61 and a movable knife 63 which is urged by springs 65 and 67 into edge contact with the cutting edge of fixed knife 61. A spring 67' similar to 67 is mounted in a similar way to the corresponding parts on the other side of the accessory shown in FIG. 7. Prior to cutoff of the material M a lever mechanism hereinafter described draws the movable knife 63 to a position below the fixed knife 61.

After exposure of the material M in the printing station 41, as hereinafter described, the drive roller 39 moves the exposed print material from printing station 41 through the cutoff station 43, between fixed knife 61 and movable knife 63, and into the processing station 45 where it is contacted with a monobath processing solution to develop and stabilize the exposed image on the material. Squeegee rollers 47 and 47' are driven at a slower peripheral speed than roller 39 since the path through which the print material M moves between the cutoff station 43 and the rollers 47 and 47' is not as long as the lengths of the exposed section of print material, a small loop of material forms between the cutoff station 43 and the processing station 45. This permits the severing of the material to occur without stopping the drive to rollers 47 and 47'. When the roller 39 stops the movable knife 63 is released so that it is raised with respect to fixed knife 61 by means of springs 65 and 67 and 67' thereby severing the exposed print material M from the unexposed material. The drive of squeegee rollers 47 and 47' continues through and after the severing operation and draws the print material M through the processing station 45 and discharges the developed and stabilized print to the front of the machine through exit 13 where it is to be received by the operator.

The processing station 45 comprises an upper tray 71, a middle tray 73 and a bottom tray 75, see FIG. 4. The upper and middle trays form a generally arcuate path for guiding the print material M therebetween. A monobath type processing solution, that is one containing ingredients for developing and then stabilizing a latent image on a photosensitive print material is circulated from the bottle 35 (see FIG. 3) by means of a pump 77 through hoses 79 and 81 into the processing station 45 where it substantially fills the lower arcuate portion of the path between the upper tray and the middle tray. Excess processing solution passes over the weir 83 in middle tray 73 and flows by gravity through drain holes 85, and the drain groove 86 in lower tray 75 through drain fitting 87 and back into the bottle 35 through drain hose 89.

In FIG. 7 the numeral 101 designates the drive motor. This drive motor drives squeegee rollers 47 and 47' through gears 103 and 103' respectively, the latter of which meshes with a gear 105 which is carried on the same shaft on which sprocket 107 is fixed. Sprocket 107 is driven by chain 109 from a sprocket 111 on motor 101. Motor 101 also drives and operates the bellows pump 77 by means of a sprocket positioned in back of sprocket 111, a chain 113 and pump sprocket 115. Pump sprocket 115 is mounted on a shaft 117 along with a cam 119. The eccentric relation of the peripheral surface on cam 119 with respect to shaft 117 causes the pump rocker 121 to be oscillated about shaft 117 as a result of the contact of the pump rocker flanges 123 with the periphery of cam 119 during rotation of the cam. Pivotal movement of the rocker 121 operates the pump bellows 125 which causes solution to be pumped from the container 35 through the hose 79 and 81 to the processing station 45 as previously stated. A second cam surface 127, fixed on cam 119, engages a pair of spring clips 129 which open and close the passages through the hose 79 and 81 and act as valves for the pump 77.

The numeral 141 designates a timing motor which drives gear 143 through a suitable gear reducer. A gear 145 carries a pin 147 for engaging and opening processor motor switch 149 upon being driven by motor 141 through gear 143. Gear 145 is carried by a link 151 which is pivotally mounted on the printer accessory frame about a stud 153. The spring 155 urges the gear 145 toward engagement with the gear 143 of the timing motor 141. A small helical spring 157 which is wound around the mount for gear 145 is arranged to resiliently urge gear 145 to a start position wherein pin 147 contacts the supporting link 151. Thus the timed period extends from the instant the gear 145 engages gear 143 until pin 147 opens switch 149. At the end of the period motor 101 is stopped.

The mechanism for obtaining print exposure will now be described. Mirror 49 is carried by support 161 which is fixed on a bracket 163 and pivotally mounted about shaft 165. Bracket 163 also carries a control roller 167, the purpose of which will be hereinafter explained. A camming link 169 is fixed to support 161 by means of a bracket 171 on the other end of mirror 49. In FIG. 4, mirror 49 is shown in its raised position, that is, the position at which it effectively screens the print material M in the printing station 41 from stray light and in which it does not interfere with the projection of an image from film F onto the viewing screen 21 of the reader. The lower position of mirror 49 is indicated in phantom in FIG. 4 and the parts are designated with a corresponding numeral primed. In that lower position camming link 169 engages the bracket 173 which is pivotally mounted about a short shaft 175 and supported by base member 177 of the projection reader. Bracket 173 carries the focus and magnification shifting lens 179. The structure of bracket 173 and the arrangement of lens 179 therein is further illustrated in FIG. 10. In FIG. 10 the projection lens 25 is shown in phantom in order to facilitate the disclosure of the other parts. When camming link 169 engages bracket 173 the bracket is pivoted about shaft 175 and lens 179 is raised out of the projected image path between the film gate 27 and lens 25. This effectively changes the focus and magnification of the projected image so that it will fit the smaller size of the printing station 41 and be in focus thereat.

During projection of an image onto the viewing screen 21, rear mirror 23, which is pivotally mounted about a shaft 181 fixed in the reader, is disposed in the position shown by the solid lines in FIG. 2. A mirror stop 183 permits minor adjustments to be made in this position. When a print exposure is being made, the mirror 23 is moved forward to engage mirror stop 185, which is also adjustable, and in this position, indicated in phantom in FIG. 2, the mirror 23 directs the projected image to mirror 49 which, in turn, directs the image to the printing station 41 where it exposes the print material M therein. A bracket 187 is fixed on the support for mirror 23 and is pivotally connected to lever 189 by pin 191. Lever 189 is pivotally connected to link 193 which is mounted for pivotal movement about shaft 195 and is rigidly attached to mirror cam follower 197. The other end of follower 197 is positioned for engagement with control roller 167 on bracket 163.

The program cam for the printer accessory is generally designated by the numeral 211. Cam 211, as best shown in FIG. 6, has five distinct cam surfaces. The surface which controls the mirror movement, and thereby the movement of lens 179 is surface 213. The program cam 211 is driven by means of the cam motor 215 from sprocket 217, chain 219, and sprocket 221. Cam motor 215 is energized in an electrical circuit through program cam switch 223 which is closed when the operator presses the print button 225 located on the front of the apparatus. Drive roller 39 is also driven by cam motor 215 from sprocket 227, chain 229, sprocket 231 and through a one-way wire clutch 233. Actuation of clutch 233 is controlled by clutch shift lever 235 which is pivoted with respect to the frame of the apparatus at 237 and is held in contact with the face of cam surface 239 by means of a spring 241.

The movement of the movable knife 63 in the cutoff station 43 is also controlled by program cam 211. The chopper cam follower 251 is mounted for pivotal movement around shaft 195 and engages the surface 253 on cam 211. The other end of follower 251 is pivotally connected to a drag link 255, and the drag link is connected to the chopper link 257 and to the chopper crank 259. Crank 259 and link 257 have similar corresponding parts on the other side of the apparatus which corresponding parts are designated by the numeral primed. The chopper cranks 259 and 259' are fixed on the mirror pivot shaft 165 and the other end of both of the chopper links is connected directly to the movable knife 63. Thus, as the program cam 211 commences its rotation, the movable knife 63 is drawn downwardly with respect to the fixed knife 61 through the linkage just described. Then when cam surface 253 has been rotated sufficiently far, cam follower 251 drops off the high spot of the cam and permits the upper knife springs 67 and 67' to pull the cutting edge of movable knife 63 in edge contact over the cutting edge of fixed knife 61 to sever the print material M which, as previously described, has been by then moved between the knives in the cutoff station 43.

Surface 261 of the program cam 211 controls the operation of the projection lamp 31 in the projection reader through switch 263. While mirror 49 is moving down into the position occupied by it during print exposure, lamp 31 is off so that it does not fog the print material M in the station 41. During print exposure it is on. During movement of mirror 49 back up to its raised position, the lamp 31 is off. After the mirror has arrived in its raised position, the circuit to the lamp is again closed and the lamp is lighted so that the reader can be used in the normal way.

Counterweight spring 265, best shown in FIG. 9, is tensioned by the nut 267 and when the cam 253 moves so that mirror cam follower 251 is in the low spot on the surface of the cam, mirror 49 is moved back up to its upper position in the printer accessory by the action of spring 265. In FIG. 9 the movable knife 63 is shown in its lower position, that is, prior to severing of the print material in solid lines and it is shown in the position which it assumes after severing the print material in phantom lines.

It will now be apparent to those skilled in the art that the printer processor accessory for a projection film reader herein disclosed greatly improves by its novel arrangement the convenience of use of this kind of apparatus and renders commercially available projection film readers more versatile and valuable to the trade.

The invention has been described in detail with particular reference to preferred embodiments thereof but it will be understood that variations and modifications can be effected within the spirit and scope of the invention as described hereinabove and as defined in the appended claims.

Having now particularly described our invention what we desire to secure by Letters Patent of the United States and what we claim is:

1. A photographic printer accessory for attachment to a projection reader having:
   (a) a viewing screen forming a portion of the front of the reader,
   (b) a projection station for receiving an image-bearing member, and
   (c) an optical system including a reflector at the rear of the reader for projecting an image from the member in said projection station through an optical path onto said screen, said accessory comprising:
   (1) an inverted L-shaped housing having a configuration generally conforming to the top and back of the reader removably mounted in piggyback relation thereon, said housing having a print discharge opening in the front thereof,
   (2) a lighttight storage chamber in the upper rear of the housing for storing a supply of photosensitive print material,
   (3) a printing station for receiving a section of said material to be exposed, said printing station being disposed in the housing adjacent to said storage chamber,
   (4) a processing unit disposed in the upper front of the housing for developing and stabilizing exposed print material and including means for directing the processed print material through said discharge opening,
   (5) a cutoff station disposed between the printing station and the processing unit for severing an exposed section of print material from the remainder thereof,
   (6) means positionable in said path between said rear reflector and said screen for directing the projected image to said printing station to expose the print material therein,
   (7) means for moving a section of print material successively from said supply in the storage chamber to said printing station for exposure, to said cutoff station for severing and through said processing unit for processing, and
   (8) means for initiating the station functions as the section of print material is positioned in the respective stations.

2. A photographic printer accessory in accordance with claim 1 and wherein a supply of processing solution for the processing station is disposed within the lower rear of said housing and said accessory further comprises means for circulating solution from said supply to said station.

3. A photographic printer accessory adapted for piggyback mounting on a projection reader having: a housing which includes a screen in the front thereof for viewing a projected image, said accessory comprising:
   a substantially L-shaped housing which generally matches the top and back of said reader housing for being mounted thereon in an operative relation, said L-shaped housing including:
   (1) a lighttight chamber for receiving a supply of unexposed print material;
   (2) first door means into said L-shaped housing to provide access to said lighttight chamber;
   (3) a printing station for receiving for exposure of an image thereon a section of unexposed print material;
   (4) a processing station for developing and stabilizing such an image on an exposed section of print material;
   (5) a storage chamber for receiving a supply of developing and stabilizing solution;
   (6) second door means into said L-shaped housing to provide access to said storage chamber;
   (7) a print discharge opening in an end of one leg of said L-shaped housing which is mounted on top of such reader housing such that said opening is disposed above said viewing screen; and
   (8) means for directing a developed and stabilized section of print material through said discharge opening.

4. The accessory in accordance with claim 3 and further comprising a cutoff station having means for severing an exposed section of print material from an unexposed supply thereof.

5. The accessory in accordance with claim 4 wherein said printing station, said cutoff station, said processing station and said discharge opening are in substantial alignment within said one leg of said L-shaped housing.

6. An accessory in accordance with claim 4 and further comprising:
   (a) means for moving a section of said print material from a supply thereof to said printing station, and after exposure at said printing station, through said cutting station and said processing station to said discharge opening;
   (b) means for directing such projected image onto a section of print material in said printing station so as to expose said section; and
   (c) means for circulating developing and stabilizing solution from a supply thereof to said processing station.

References Cited by the Examiner

UNITED STATES PATENTS

| | | | |
|---|---|---|---|
| 1,971,370 | 8/1934 | Diaz | 88—24 X |
| 2,186,637 | 1/1940 | Green et al. | 88—24 X |
| 2,737,079 | 3/1956 | Brown et al. | 88—24 X |
| 2,927,503 | 3/1960 | Zollinger | 88—24 |
| 2,938,427 | 5/1960 | Alves | 88—24 |
| 2,971,445 | 2/1961 | Orlando | 95—89 X |
| 2,979,026 | 4/1961 | Reuter | 88—24 X |
| 3,040,640 | 6/1962 | Abel, Jr. et al. | 88—24 X |
| 3,055,266 | 9/1962 | Frantz et al. | 95—89 X |

NORTON ANSHER, *Primary Examiner.*

EMIL G. ANDERSON, *Examiner.*